Aug. 4, 1959      R. E. NOVKOV      2,897,579
CUT-OFF TOOL
Filed Jan. 6, 1956
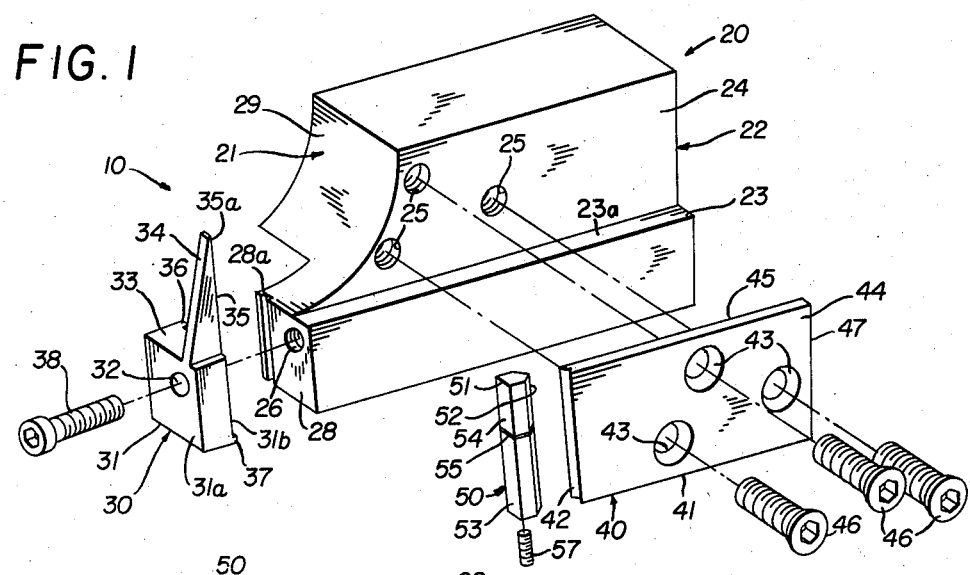
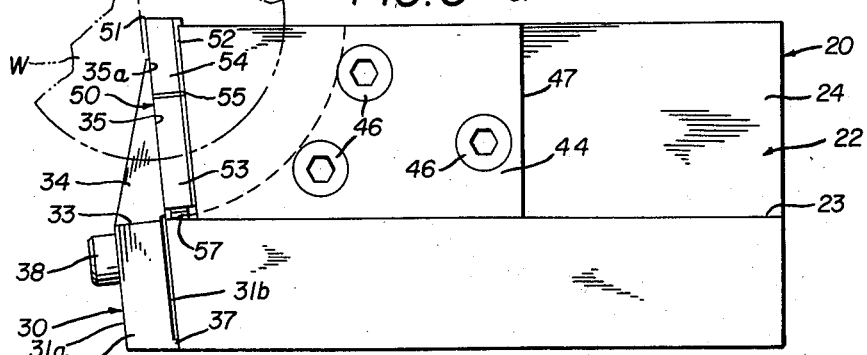
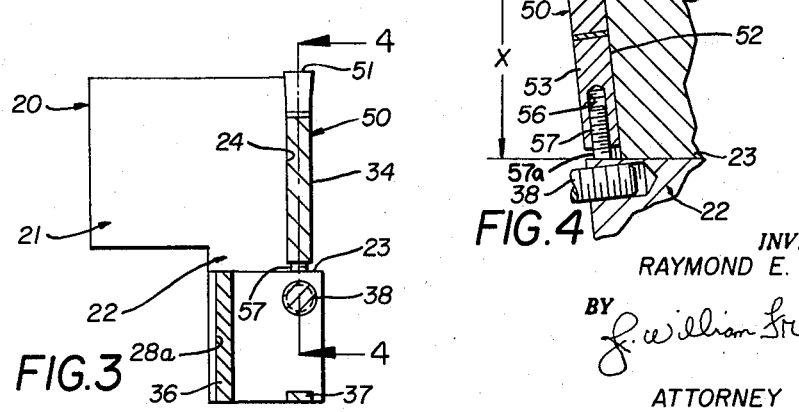
INVENTOR.
RAYMOND E. NOVKOV
BY J. William Freeman
ATTORNEY United States Patent Office 2,897,579
Patented Aug. 4, 1959

2,897,579

CUT-OFF TOOL

Raymond E. Novkov, Akron, Ohio, assignor to Manchester Machine & Tool Company, Akron, Ohio, a corporation of Ohio Application January 6, 1956, Serial No. 557,785

6 Claims. (Cl. 29—96)

This invention relates to machine tools, and in particular relates to an improved cut-off or parting type of tool for use on lathes or other turning machinery of known construction.

It has long been known in the prior art that a length of work can be cut or trimmed into a shorter length during the supported rotational movement thereof by the application of a cutting tool against the rotating external surface of the work. In the great majority of cases, such cut-off operations are effectuated by the use of a lathe, with the work being rotatably supported about its central axis over the lathe bed while the cut-off tool is secured to the cross-slide carriage so as to move transversely of the lathe bed and thus engage the rotating work surface.

To the present time, cut-off tools of known construction have been characterized by their inability to fully attain one or more of the following desired requirements:

First, the cutting edge per se of the cutting tool must be positioned so that the same will move along a radial plane that extends through the centerline of the work as defined by its position of mounting on the tail stock or face plate of the lathe. This requirement insures correct contact between the cutting edge and the revolving workpiece.

In many instances, the prior art has failed in this requirement, because of the fact that the cutting tool, upon being repositioned after removal for sharpening, for example, is not correctly relocated in the carriage tool holder of the cross-slide and accordingly, the cutting surface is not positioned in the required horizontal plane that is above described.

The second requirement of correct cut-off tool construction is that the cut-off bit per se be rigidly and solidly supported at all times during the cut-off operation, so that any detrimental vibration or "chatter" is avoided. The "quick change" requirement of present day machine tool practice has heretofore limited the amount of support that can be utilized, with the result that conventional cut-off tools are at the present time subject almost without exception, to varying degrees of vibrational "chatter" which accordingly limits the efficiency of the cut-off operation.

A third requirement for the theoretically ideal cut-off tool is that the tool bit per se and the support blade therefor be capable of rapidly dissipating the relatively high temperature that occurs at the point of cut, so as to avoid premature tool damage that occurs as a result of "hot chips" welding to the cut-off tool upon their removal from the workpiece during the cut-off operation.

In co-pending application Serial No. 505,488, filed May 2, 1955, now patent No. 2,846,756 issued August 12, 1958, by Raymond E. Novkov, there was disclosed an improved type of cut-off tool that met each and every one of the above requirements, and which featured the use of a cutting bit that was carried in a radial plane by the use of a support blade that projected outwardly from the tool body so as to permit contact between the rotating surface and the tool bit.

While the performance of the cut-off tool referred to in the above indicated co-pending application has been satisfactory in general usage, it has been found that improved results will occur if the cutting bit is disposed in a substantially tangential plane, so that the cutting plane of the edge portion thereof is approximately normal to the rotating work at the point of cutting contact therewith. Specifically, it has been found that the greatest force resisting cutting action is directed tangentially of the rotating work. Accordingly, if the cutting tool is arranged so as to have its longitudinal length disposed in this tangential plane, it is apparent that the same will be able to absorb the cutting force through the longitudinal length of the same. By way of contrast, in devices where the cutting bit is disposed in a radial plane, the cutting point and its support will be disposed substantially normal to the direction of force, with the result that the forces received by the blade and bit will tend to bend or flex the same through the longitudinal length thereof. By way of contrast, a bit mounted substantially tangential to the cutting force will provide compressive support through its entire length of hard stiff tool material. Thus, by featuring a cut-off tool that is substantially disposed in the line of said force, the cutting bit per se is capable of absorbing this force throughout its longitudinal length; with the result that improved cutting action will occur in such cases.

It accordingly becomes a principal object of this invention to provide a cut-off tool including a rigidly supported elongated tool bit that has the longitudinal length thereof disposed in the tangential plane of contact with the work being turned.

It is a further object of this invention to provide a cut-off tool characterized by the presence of a cutting bit that is capable of being disposed tangential to the rotating surface of the work being turned and which is further characterized by the presence of self-contained adjustment means therein, whereby the cutting bit may be "preset" prior to attachment to the tool body per se.

These and other objects of the invention will become more apparent upon a reading of the following brief specification, considered and interpreted in the light of the accompanying drawings.

Of the drawings:

Figure 1 is an exploded perspective view of the improved cut-off tool.

Figure 2 is a side elevation of the assembled cut-off tool.

Figure 3 is a view taken on the lines 3—3 of Figure 2.

Figure 4 is a view taken on the lines 4—4 of Figure 3.

Figure 5 is a side elevation of a modified form of the invention.

Referring now to the drawings, and in particular to Figure 1 thereof, the improved cut-off tool, generally designated by the numeral 10, is shown as including a tool body 20, to which is fixedly secured a clamping block 30 and a support blade 40; the arrangement being such that the body 20, block 30 and blade 40 coact together, as will be described, to support a cutting bit 50, so that the cutting edge 51 thereof can contact the revolving workpiece W, as is shown in phantom lines in Figure 2 of the drawings.

For the purpose of effectuating such coaction between the component parts, the tool body 20 comprises a solid block of material formed in what may be generally designated as an L-shaped cross-sectional configuration, to thus define a flange portion 21 and a main body portion designated by the numeral 22, with the flange portion 21 being carried by the cross-slide of a lathe, for example, in known manner; while the body portion 22 supports the component parts, as will be described.

To this end, one side surface of the body 22 is shown as including a longitudinally undercut surface 24 that defines a supporting ledge 23, upon which the blade 40 may rest when the same is abutted against the undercut surface 24 by the use of bolts 46, 46 that are received in tapped apertures 25, 25 (see Figure 1). A similar tapped aperture 26 is provided on the forwardly disposed surface 28 of body portion 22 for the purpose of releasably receiving thereagainst a clamping block 30, and as shown in Figure 2, the plane of the surface 28 may be disposed slightly out of vertical to permit a small degree of angularity to exist between the cutting edge 51 and the work W. Similarly, to avoid displacement or rotational movement of the clamping block 30 about surface 28 during the cutting operation, the surface 28 may further include a groove 28a that extends between the opposed edge portions thereof. As shown in Figure 1 of the drawings, the front or leading edge portion of the tool body 20 is provided with an arcuate surface 29 which facilitates insertion of the assembled tool into the work and thus provides clearance for the rotating work, as shown in Figure 2 of the drawings.

Turning now to the construction of the clamping block 30, it will be seen that the same includes a base portion 31 of generally rectangular configuration, which base 31 is provided with an aperture 32 that extends between the opposed faces 31a and 31b thereof, for purposes to be described. One edge portion 33 of base 31 further defines a projecting arm 34 of tapering cross-sectional configuration. This arm 34 defines a clamping surface 35 that is inclined slightly with respect to the plane of the surface 31b, so as to permit the extreme end 35a thereof to initially contact the surface of the cutting bit 50, as will be described. In addition to the aforementioned component parts, the face 31b further includes a transversely extending rib 36 as well as a small projection 37 (see Figure 1) that is designed to engage against the surface 28, with the rib 36 being received in the groove 28a of surface 28, while the projection 37 abuts against surface 28 at a spaced point. Bolt 38 passing through aperture 32 for reception in tapped aperture 26 facilitates retention of the block 30 with respect to the tool body 20; so that upon the tightening of the bolt 38, the clamping surface 35 of the arm 34 will be tightly urged into contact with the cutting bit 50, with the leading edge 35a thereof first contacting the bit 50.

Considering next the construction of the support blade 40, it will be seen from Figure 1 of the drawings that the same is of generally quadrilateral configuration, so as to include a longitudinal edge portion 41 and a leading frontal edge portion 42 which is shown in the drawings as being V-shaped in cross-sectional configuration, for purposes to be subsequently described.

Additionally, the support blade 40 is provided with a series of apertures 43, 43 that extend between the faces 44, 45 thereof, so as to permit insertion of both bolts 46, 46 therethrough, with the latter being received in the apertures 25, 25, as shown in Figure 2 of the drawings. In this regard, it is to be noted that the preferred form of the invention contemplates that the individual apertures 43, 43 be located at a slightly greater distance from the edge portion 41 than are the apertures 25, 25, with respect to the ledge portion 23. In this manner, insertion of the bolts 46, 46 within the apertures 25, 25, and tightening of these bolts will operate in effect, to draw down plate 40 into contact with the ledge portion 23 to minimize the detrimental chattering effect that might possibly otherwise occur. It is also to be noted that if desired, a backing support could be provided on the tool body in the form of a rear ledge (not shown) that would be formed integral of body 20 so as to engage against the rear edge 47 of the support plate 40, to thus prevent rearward movement of the plate 40 during the cutting operation.

As best shown in Figure 1 of the drawings, the cutting bit 50 is of elongated configuration and includes a V-shaped frontal portion 52 that is designed for engagement within the complementally shaped V-groove 42 of the support blade 40. Also, as indicated in the drawings, the preferred embodiment of the invention contemplates the use of a metallic shank portion 53 and a carbide tip portion 54 that are abutted together at juncture line 55, as by brazing or welding, with the cutting edge 51 being flared outwardly to provide the widest portion of the cutting bit 50 per se.

In order that the component parts might function as will hereinafter be described, the shank portion 53 is shown provided with an internal tapped aperture 56, within which is threaded a stud 57; the arrangement being such that the free end 57a of the stud 57 can contact the surface 23a of the ledge 23, and in this manner the overall length of the cutting bit 50 per se may be determined prior to its installation between the blade 40 and the block 30, with suitable anti-rotational means being provided, if desired, between the stud 57 and the aperture 56.

In use of or operation of the improved cut-off tool, the flange portion 21 may first be conveniently positioned within the appropriate holder of the lathe, for example, and fixedly retained therein in known manner. In this condition, the blade 40 may be secured with respect to the body portion 20 by merely passing the bolts 46, 46 through the apertures 43, 43 of the blade 40 and inserting the same within the tapped apertures 25, 25 that are provided on the face 24 of body portion 20. By tightening these bolts 46, 46 after this preliminary positioning, it is apparent that the blade 40 will have the longitudinal edge portion 41 thereof drawn down against the ledge portion 23, so that the same is firmly fixed with respect to the body 20.

At this time, the clamping block 30 may be assembled by passing the bolt 38 through aperture 32 and causing the free end of the same to be received in tapped aperture 26 that is provided on surface 28 of the tool body 20; with care being taken during such installation to position the rib 36 within the appropriate slot 28a provided on the surface 28. It is not necessary at this time that the bolt 38 be tightened all the way; and prior to such tightening of the bolt the cutting bit 50 may be inserted between the clamping surface 35 and the V-cut surface 42 of the blade 40. During such installation of the cutting bit 50, it is apparent that the same may be preset so as to establish a predetermined distance such as dimension "x" (see Figure 4) prior to installation.

In this manner, the cutting edge 51 of the cutting bit 50 will be positioned at a predetermined distance above the ledge 23, and by known method of operating the lathe, this presetting will enable the cutting edge 51 to be located in the exact plane required. When the cutting bit 50 has been preset and positioned between the clamping arm 34 and the support blade 40 as just described, the same may be fixedly retained therebetween by merely tightening the bolt 38. During such tightening, the projection 37 will act as a fulcrum point, and the upper edge portion with surface 31b (see Figure 1) of body 31, will be moved towards the surface 28, as will the surface 35 of the clamping arm 34, to thus firmly clamp the cutting bit 50 between the surface 35 and the V-groove surface 42 of the support blade 40. When the bolt 38 has been tightened sufficiently, the cut-off operation may begin.

After a cut-off operation has taken place, and in the event it is necessary to remove the tool for regrinding, it is merely necessary that the bolt 38 be backed off; and upon loosening of the bolt 38, the bit 50 may be easily removed with respect to its location between the clamping arm 34 and the support blade 40, and upon removal of the same the tool may be ground and a reground cutting edge 51 provided.

By reason of the fact that the overall length of the cutting tool should remain sufficient in order to cut on center in all cases, it will be necessary, in the event that sufficient stock has been ground off, to reset the overall length of the tool. This may be easily facilitated by rotating the stud 57 within the tapped aperture 56 so as to increase the overall length to the requisite dimension "x" as shown in Figure 4 of the drawings. Upon regrinding and resetting as just described, the cutting bit 50 may be replaced by merely tightening the bolt 38, as has been previously described.

During the actual cutting operation that ensues, it is apparent that the majority of thrust will be absorbed through the longitudinal length of the cutting bit 50. By virtue of the fact that this force is transmitted directly to the ledge 23, it is apparent that a minimum amount of vibrational "chatter" will occur. In this regard, it is to be particularly noted that while the clamping block 30 properly secures the cutting bit 50 against the support blade 40, that a lesser degree of holding action could be provided in this regard, due to the fact that it has been found that the cutting bit 50 must only be retained firmly against movement downwardly during the cutting action, because of the fact that the cutting force is tranmitted in this direction, as shown in Figure 2 of the drawings; and only a very slight component force would be exerted during the cutting operation that would tend to separate the cutting bit 50 from the support blade 40. Thus, in practice it is to be understood that a less expensive model could be made that would employ a lesser degree of clamping action than is provided by the clamping block 30, although for heavy duty work use of the clamping block 30 of the type above described is recommended.

The modified form of the invention, as shown in Figure 5 of the drawings, is similar in all respects to the preferred embodiment of the invention disclosed in Figures 1 through 4 of the drawings, with the single exception that a safety feature, in the form of a cut-off switch 63 is provided. Accordingly, where indicated, like numerals designate like parts.

As has been found in the use of parting tools of this general description, when such tools are used in automatic machines, tool failure frequently will go unnoticed by the operator until such time as the machine has inflicted surface damage on the remaining component parts of the parting tool. In this instance, it has been found that in the event the carbide tip portion 54 should break, that the continued operation of the machine would result in destruction or mutilation of the support blade 40, with the result that the same would have to be replaced at considerable expense to the user.

In the modified form of the invention shown in Figure 5, a plunger rod 61 is axially mounted within a housing 62; the arrangement being such that the same is normally extended to the full line position of Figure 5 by the use of internal springs (not shown) so that a solenoid valve 63 is normally open to permit electrical current to be supplied to the machine. The housing 62, as well as the plunger rod 61 are shown located in this modified form of the invention on the top edge of the support blade 40, so as to be coextensive with the same, with the free end of plunger rod 61 being in contact with the carbide tip 54. In the event of failure or breaking off of the carbide tip as shown by the dotted lines in Figure 5, the internal springs of the housing 62 will urge the plunger rod 61 to the left of Figure 5, with the result that the solenoid switch 63 will be operated to close the flow of electric current to the machine, and thus effectuate an automatic shut-off operation.

It has been shown in the preceding paragraphs how there has been provided a new and novel type of cut-off tool, that is characterized by the use of a cutting bit that is provided with self-adjustment means that facilitates the accurate reuse of the cutting tool after a grinding operation thereon.

During the preceding specification, specific reference has been made on certain occasions, to exact configurations and compositions in order to more clearly describe the invention. It is to be understood that these specific disclosures are indicative of one disclosed form of the invention only, and that such disclosures are not intended to limit the scope of this invention beyond the reasonable breadth of protection afforded by the hereinafter recited claims.

It accordingly follows that other modifications of the invention may be resorted to without departing from the spirit thereof or the scope of the appended claims.

This application is a continuation in part of Serial No. 505,488, filed May 2, 1955, by Raymond E. Novkov.

What is claimed is:

1. A cut-off tool of the character described, comprising: a tool body having front and rear surfaces and a supporting ledge surface interconnecting said front and rear surfaces; a support blade having a longitudinal edge portion thereof received on said ledge with one face of said blade being abutted against said body and having a front edge surface that is disposed inwardly of said front surface of said tool body when said blade is positioned on said ledge; a clamping block having a base portion thereof releasably retained against said front surface of said tool body and having an elongate arm portion thereof overlying said frontal edge surface of said support blade; a cutting bit of elongate configuration receivable between said spaced arm and said front edge surface of said support blade and being supported at one end thereof by said ledge.

2. The device of claim 1 further characterized by the presence of means for spacing said bit at varying distances from said ledge.

3. A cut-off tool of the character described, comprising: a tool body having front and rear surfaces and a supporting ledge surface interconnecting said front and rear surfaces; a support blade having a longitudinal edge portion thereof received on said ledge with one face of said blade being abutted against said body and having a front edge surface that is disposed inwardly of said front surface of said tool body when said blade is positioned on said ledge; a clamping block having a base portion thereof releasably retained against said front surface of said tool body and having an elongate arm portion thereof overlying said frontal edge surface of said support blade; a cutting bit of elongate configuration receivable between said spaced arm and said front edge surface of said support blade and being supported at one end thereof by said ledge, said bit having a threaded axial bore at one end thereof; and a threaded stud received in said bore and projecting beyond said bit for engagement with said ledge.

4. A cut-off tool of the character described, comprising: a tool body having front and rear surfaces and a supporting ledge surface interconnecting said front and rear surfaces; a support blade having a longitudinal edge portion thereof received on said ledge with one face of said blade being abutted against said body and having a front edge surface that is disposed inwardly of said front surface of said tool body when said blade is positioned on said ledge; a clamping block having a base portion thereof releasably retained against said front surface of said tool body and having an elongate arm portion thereof overlying said frontal edge surface of said support blade; a cutting bit of elongate configuration receivable between said spaced arm and said front edge surface of said support blade and being supported at one end thereof by said ledge and means for preventing rotational movement of said base portion relatively of said front surface of said tool body.

5. A cut-off tool of the character described, comprising: a tool body having front and rear surfaces and a supporting ledge surface interconnecting said front and rear surfaces; a support blade having a longitudinal edge portion thereof received on said ledge with one face of said blade being abutted against said body and having a front edge surface that is disposed inwardly of said front surface of said tool body when said blade is positioned on said ledge; a clamping block having a base portion thereof releasably retained against said front surface of said tool body and having an elongate arm portion thereof overlying said frontal edge surface of said support blade; a cutting bit of elongate configuration receivable between said spaced arm and said front edge surface of said support blade and being supported at one end thereof by said ledge; said face of said base portion that is adjacent said frontal face of said body being provided with projections that contact said frontal face of said body; said projections being spaced to permit movement of one corner of said face towards a corresponding corner of said frontal face of said body, whereby said arm may be urged towards said frontal edge of said blade to clamp said bit between said arm and said blade.

6. A cut-off tool of the character described, comprising: a tool body having front and rear surfaces and a supporting ledge surface interconnecting said front and rear surfaces; a support blade having a longitudinal edge portion thereof received on said ledge with one face of said blade being abutted against said body and having a front edge surface that is disposed inwardly of said front surface of said tool body when said blade is positioned on said ledge; a clamping block having a base portion thereof releasably retained against said front surface of said tool body and having an elongate arm portion thereof overlying said frontal edge surface of said support blade; a cutting bit of elongate configuration receivable between said spaced arm and said front edge surface of said support blade and being supported at one end thereof by said ledge; said face of said base portion that is adjacent said frontal face of said body being provided with projections that contact said frontal face of said body; said projections being spaced to permit movement of one corner of said face towards a corresponding corner of said frontal face of said body, whereby said arm may be urged towards said frontal edge of said blade to clamp said bit between said arm and said blade; said projections on said base including a rib extending transversely thereof for reception in said groove, whereby relative rotational movement between said faces is obviated.

References Cited in the file of this patent

UNITED STATES PATENTS

| | | |
|---|---|---|
| 1,647,989 | Gibbs | Nov. 8, 1927 |
| 1,700,610 | Drees | Jan. 29, 1929 |
| 1,855,971 | Kilmer | Apr. 26, 1932 |
| 1,970,016 | Morton | Aug. 14, 1934 |
| 2,101,157 | Redinger | Dec. 7, 1937 |
| 2,105,757 | Rosenberg | Jan. 18, 1938 |
| 2,154,576 | Morton | Apr. 18, 1939 |
| 2,183,796 | Saffady | Dec. 19, 1939 |
| 2,202,591 | Luers | May 28, 1940 |
| 2,252,893 | Macklin | Aug. 19, 1941 |
| 2,398,913 | Anthony | Apr. 23, 1946 |
| 2,683,302 | Bader | July 13, 1954 |
| 2,697,866 | Greenleaf | Dec. 28, 1954 |
| 2,716,799 | Bader | Sept. 6, 1955 |
| 2,737,705 | Novkov | Mar. 13, 1956 |